(12) United States Patent
Tseng et al.

(10) Patent No.: US 10,411,990 B2
(45) Date of Patent: Sep. 10, 2019

(54) ROUTING STABILITY IN HYBRID SOFTWARE-DEFINED NETWORKING NETWORKS

(71) Applicants: AT&T Intellectual Property I, L.P., Atlanta, GA (US); Cornell University, Ithaca, NY (US)

(72) Inventors: Shih-Hao Tseng, Ithaca, NY (US); Ao Tang, Ithaca, NY (US); Simon Tse, Holmdel, NJ (US); Gagan Choudhury, Jackson, NJ (US)

(73) Assignees: AT&T Intellectual Property I, L.P., Atlanta, GA (US); Cornell University, Ithaca, NY (US)

( * ) Notice: Subject to any disclaimer, the term of this patent is extended or adjusted under 35 U.S.C. 154(b) by 35 days.

(21) Appl. No.: 15/845,335

(22) Filed: Dec. 18, 2017

(65) Prior Publication Data

US 2019/0190814 A1    Jun. 20, 2019

(51) Int. Cl.
*H04L 12/703* (2013.01)
*H04L 12/715* (2013.01)
(Continued)

(52) U.S. Cl.
CPC ............ *H04L 45/021* (2013.01); *H04L 45/28* (2013.01); *H04L 45/54* (2013.01); *H04L 45/64* (2013.01);
(Continued)

(58) Field of Classification Search
CPC ....... H04L 45/02; H04L 45/021; H04L 45/04; H04L 45/0813; H04L 45/10; H04L 45/12;
(Continued)

(56) References Cited

U.S. PATENT DOCUMENTS

| 6,735,198 B1 * | 5/2004 | Edsall .................... H04L 45/54 370/389 |
| 7,551,627 B2 * | 6/2009 | Scholl .................... H04L 45/04 370/400 |

(Continued)

FOREIGN PATENT DOCUMENTS

| CA | 2924210 A1 * | 4/2015 | ............. H04L 45/12 |
| CN | 1998196 A * | 7/2007 | ............. H04L 45/00 |

(Continued)

OTHER PUBLICATIONS

Farrel et al., RFC 4655, A Path Computation Element (PCE)-Based Architecture, Aug. 2006, IETF (Year: 2006).*

(Continued)

*Primary Examiner* — Eric Nowlin
(74) *Attorney, Agent, or Firm* — Hartman & Citrin LLC

(57) ABSTRACT

Concepts and technologies disclosed herein are directed to routing stability in a hybrid software-defined networking ("SDN") network in which control plane functionality is shared between a centralized SDN controller and a plurality of local routers. The controller can collect data plane messages from the plurality of local routers, extract information corresponding to source nodes and edges of a graph representative of the hybrid SDN network, and store the information as entries in a table. The controller can identify any outdated entries and remove any outdated entries from the table. The controller can obtain recovered information missing from the information collected from the data plane messages. The controller also can calculate an effective capacity of the edges. The controller can then generate a stable routing pattern based upon the recovered information and the effective capacity. The controller can deploy the stable routing pattern in the hybrid SDN network.

20 Claims, 10 Drawing Sheets

(51) Int. Cl.
*H04L 12/717* (2013.01)
*H04L 12/721* (2013.01)
*H04L 12/741* (2013.01)
*H04L 12/755* (2013.01)
*H04L 12/771* (2013.01)

(52) U.S. Cl.
CPC .............. *H04L 45/42* (2013.01); *H04L 45/44* (2013.01); *H04L 45/56* (2013.01)

(58) Field of Classification Search
CPC ......... H04L 45/28; H04L 45/42; H04L 45/44; H04L 45/54; H04L 45/56; H04L 45/64
See application file for complete search history.

(56) References Cited

U.S. PATENT DOCUMENTS

| | | | |
|---|---|---|---|
| 7,904,589 B2 * | 3/2011 | Van Der Merwe | H04L 45/04 370/351 |
| 7,961,638 B2 * | 6/2011 | Porat | H04L 41/0803 370/252 |
| 8,166,195 B2 * | 4/2012 | Van Der Merwe | H04L 45/04 370/351 |
| 8,606,105 B2 * | 12/2013 | Ong | H04L 45/586 398/47 |
| 8,792,374 B1 * | 7/2014 | Jain | H04L 45/42 370/252 |
| 8,830,820 B2 * | 9/2014 | Mandal | H04L 45/64 370/217 |
| 9,185,031 B2 * | 11/2015 | Okita | H04L 43/0817 |
| 9,225,635 B2 * | 12/2015 | Kumbhare | H04L 45/56 |
| 9,350,684 B2 * | 5/2016 | Willis | H04L 45/02 |
| 9,397,952 B2 | 7/2016 | Liu et al. | |
| 9,407,534 B2 | 8/2016 | Chunduri et al. | |
| 9,450,817 B1 | 9/2016 | Bahadur et al. | |
| 9,450,864 B2 * | 9/2016 | Zhao | H04L 45/42 |
| 9,479,409 B2 | 10/2016 | Zhang et al. | |
| 9,503,374 B2 * | 11/2016 | Luo | H04L 45/7457 |
| 9,548,930 B1 * | 1/2017 | Hardie | H04L 47/18 |
| 9,680,665 B2 | 6/2017 | Luo et al. | |
| 9,699,116 B2 | 7/2017 | Zhang et al. | |
| 9,705,694 B2 | 7/2017 | Dronadula et al. | |
| 9,705,783 B2 | 7/2017 | Jogalekar et al. | |
| 9,722,922 B2 * | 8/2017 | Kamath | H04L 45/56 |
| 9,742,657 B2 * | 8/2017 | Narayanan | H04L 45/021 |
| 9,762,479 B2 * | 9/2017 | Beshai | H04L 45/44 |
| 9,774,504 B2 | 9/2017 | Utgikar | |
| 9,813,333 B2 * | 11/2017 | Zhao | H04L 45/42 |
| 9,825,850 B2 * | 11/2017 | Chen | H04L 45/64 |
| 9,882,804 B2 * | 1/2018 | Thubert | H04L 45/12 |
| 9,906,439 B2 * | 2/2018 | Aldrin | H04W 40/12 |
| 10,033,622 B2 * | 7/2018 | Pandya | H04L 45/02 |
| 10,063,466 B2 * | 8/2018 | Sauer | H04L 45/38 |
| 10,103,969 B2 * | 10/2018 | Sebastian | H04L 45/12 |
| 10,219,175 B2 * | 2/2019 | Costa-Requena | H04L 12/4633 |
| 10,230,632 B2 * | 3/2019 | Cui | H04L 67/16 |
| 2004/0006640 A1 * | 1/2004 | Inderieden | H04L 45/00 709/242 |
| 2005/0074010 A1 * | 4/2005 | Kim | H04L 45/60 370/394 |
| 2006/0159020 A1 * | 7/2006 | Porat | H04L 41/0803 370/235 |
| 2006/0179158 A1 * | 8/2006 | Randriamasy | H04L 45/02 709/238 |
| 2007/0055789 A1 * | 3/2007 | Claise | H04L 45/02 709/234 |
| 2008/0031236 A1 * | 2/2008 | Yang | H04L 45/02 370/389 |
| 2009/0109852 A1 * | 4/2009 | Grover | H04L 45/02 370/235 |
| 2010/0329154 A1 * | 12/2010 | Charzinski | H04L 45/00 370/255 |
| 2011/0067039 A1 * | 3/2011 | Eilert | G06F 15/17318 719/328 |
| 2011/0125920 A1 * | 5/2011 | Van Der Merwe | H04L 45/04 709/235 |
| 2011/0205933 A1 * | 8/2011 | Porat | H04L 41/0803 370/254 |
| 2013/0071116 A1 * | 3/2013 | Ong | H04L 45/586 398/45 |
| 2013/0094350 A1 * | 4/2013 | Mandal | H04L 45/64 370/217 |
| 2013/0266007 A1 * | 10/2013 | Kumbhare | H04L 45/56 370/389 |
| 2013/0329601 A1 * | 12/2013 | Yin | H04L 45/02 370/254 |
| 2014/0115137 A1 * | 4/2014 | Keisam | H04L 12/6418 709/223 |
| 2014/0355415 A1 * | 12/2014 | Mandal | H04L 45/64 370/218 |
| 2015/0043383 A1 | 2/2015 | Farkas et al. | |
| 2015/0078381 A1 * | 3/2015 | Willis | H04L 45/02 370/392 |
| 2015/0089081 A1 * | 3/2015 | Thubert | H04L 45/12 709/239 |
| 2015/0103844 A1 * | 4/2015 | Zhao | H04L 45/42 370/410 |
| 2015/0124625 A1 * | 5/2015 | Aldrin | H04W 40/12 370/238 |
| 2015/0163152 A1 * | 6/2015 | Li | H04L 47/2441 370/409 |
| 2015/0207741 A1 * | 7/2015 | Luo | H04L 45/52 370/235 |
| 2015/0215202 A1 * | 7/2015 | Sauer | H04L 45/38 370/256 |
| 2015/0326426 A1 | 11/2015 | Luo et al. | |
| 2015/0350077 A1 | 12/2015 | Durrani et al. | |
| 2016/0028623 A1 * | 1/2016 | Kamath | H04L 45/56 370/410 |
| 2016/0080274 A1 | 3/2016 | Meyer et al. | |
| 2016/0119255 A1 * | 4/2016 | Luo | H04L 49/557 370/218 |
| 2016/0134524 A1 * | 5/2016 | Beshai | H04L 45/44 370/406 |
| 2016/0191370 A1 * | 6/2016 | Wood | H04L 45/02 370/238 |
| 2016/0277290 A1 * | 9/2016 | Sivabalan | H04L 45/50 |
| 2016/0301603 A1 * | 10/2016 | Park | H04L 45/586 |
| 2016/0337937 A1 * | 11/2016 | McCann | H04L 45/64 |
| 2016/0352613 A1 * | 12/2016 | Narayanan | H04L 45/021 |
| 2016/0359735 A1 * | 12/2016 | Zhao | H04L 45/42 |
| 2016/0366632 A1 | 12/2016 | Cui et al. | |
| 2017/0005906 A1 * | 1/2017 | Chen | H04L 45/64 |
| 2017/0005910 A1 * | 1/2017 | Sebastian | H04L 45/12 |
| 2017/0006067 A1 | 1/2017 | Narain | |
| 2017/0041824 A1 * | 2/2017 | Costa-Requena | H04L 41/12 |
| 2017/0063635 A1 * | 3/2017 | Choi | H04L 41/12 |
| 2017/0093686 A1 * | 3/2017 | Uttaro | H04L 45/021 |
| 2017/0118066 A1 * | 4/2017 | Mathew | H04L 41/0663 |
| 2017/0126482 A1 * | 5/2017 | Jayaraman | H04L 41/0668 |
| 2017/0187607 A1 | 6/2017 | Shaikh et al. | |
| 2017/0195255 A1 | 7/2017 | Pham et al. | |
| 2017/0250869 A1 | 8/2017 | Voellmy | |
| 2017/0289027 A1 * | 10/2017 | Ratnasingham | H04L 45/50 |
| 2018/0034730 A1 * | 2/2018 | Zhao | H04L 45/42 |
| 2018/0103061 A1 * | 4/2018 | Allen | H04L 63/1491 |
| 2018/0131604 A1 * | 5/2018 | Zhou | H04L 45/02 |
| 2018/0227224 A1 * | 8/2018 | Bhaskar | H04L 45/02 |
| 2018/0295057 A1 * | 10/2018 | Cui | H04L 67/16 |
| 2018/0367441 A1 * | 12/2018 | Liu | H04L 69/18 |

FOREIGN PATENT DOCUMENTS

| | | | | |
|---|---|---|---|---|
| CN | 103947164 A | * | 7/2014 | ............ H04L 45/64 |
| CN | 103947164 B | * | 3/2016 | ............ H04L 45/64 |
| CN | 105580331 A | * | 5/2016 | ............ H04L 45/12 |
| CN | 106105116 | | 9/2016 | |
| CN | 107005474 A | * | 8/2017 | ............ H04L 45/02 |
| DE | 202012013425 U1 | * | 1/2017 | ............ H04L 45/64 |

(56) References Cited

FOREIGN PATENT DOCUMENTS

| | | | | |
|---|---|---|---|---|
| EP | 2571210 A1 * | 3/2013 | ........... | H04L 45/586 |
| EP | 2767040 A1 * | 8/2014 | ........... | H04L 45/64 |
| EP | 2767040 A4 * | 5/2015 | ........... | H04L 45/64 |
| EP | 3050263 A2 * | 8/2016 | ........... | H04L 45/12 |
| EP | 2571210 B1 * | 4/2017 | ........... | H04L 45/586 |
| EP | 2767040 B1 * | 5/2017 | ........... | H04L 45/64 |
| KR | 101527786 B1 * | 6/2015 | | |
| WO | WO-0206918 A2 * | 1/2002 | ........... | H04L 41/082 |
| WO | WO-0206918 A3 * | 3/2005 | ........... | H04L 41/082 |
| WO | WO-2006003141 A1 * | 1/2006 | ........... | H04L 45/00 |
| WO | WO-2013055697 A1 * | 4/2013 | ........... | H04L 45/64 |
| WO | WO 2014/187037 | 11/2014 | | |
| WO | WO-2015048239 A2 * | 4/2015 | ........... | H04L 45/12 |
| WO | WO-2015048239 A3 * | 6/2015 | ........... | H04L 45/12 |
| WO | WO-2016193852 A1 * | 12/2016 | ........... | H04L 45/021 |
| WO | WO-2017004778 A1 * | 1/2017 | ........... | H04L 45/02 |
| WO | WO 2017/118875 | 7/2017 | | |
| WO | WO 2017/142516 | 8/2017 | | |
| WO | WO-2017152768 A1 * | 9/2017 | ........... | H04L 69/18 |

OTHER PUBLICATIONS

Gredler et al., RFC 7752, North-Bound Distribution of Link-State and Traffic Engineering (TE) Information using BGP, Mar. 2016, IETF (Year:2016).*

Zhao et al., Synchronizing routing information of control plane and forwarding plane gracefully, Jun. 9, 2006, IEEE, 2006 Workshop on High Performance Switching and Routing, DOI: 10.1109/HPSR.2006.1709696 (Year: 2006).*

Amin et al., Hybrid SDN Networks: A Survey of Existing Approaches, May 17, 2018, IEEE, IEEE Communications Surveys & Tutorials, vol. 20, Issue 4, Fourth Quarter (Year: 2018).*

Mendiola et al., A Survey on the Contributions of Software-Defined Networking to Traffic Engineering, Nov. 30, 2016, IEEE, IEEE Communications Surveys & Tutorials, vol. 19, Issue 2, Second Quarter 2017 (Year: 2016).*

Vissicchio et al., "On the Co-Existence of Distributed and Centralized Routing Control-Planes," 2015 IEEE Conference on Computer Communications, Apr. 26-May 1, 2015, IEEE, 2015.

Rothenberg et al., "Revisiting Routing Control Platforms with the Eyes and Muscles of Software-Defined Networking," Proceedings of the first workshop on Hot topics in software defined networks, Aug. 13, 2012 ACM, 2012.

Kotronis et al., "Outsourcing the Routing Control Logic: Better Internet Routing Based on SDN Principles," Proceedings of the 11th ACM Workshop on Hot Topics in Networks, Oct. 29-30, 2012, ACM 2012.

Tilmans et al., "IGP-as-a-Backup for Robust SDN Networks," Proceedings of the 10th International Conference on Network and Service Management, Nov. 17-21, 2017, IEEE, 2014.

Caria et al., "SDN Partitioning: A Centralized Control Plane for Distributed Routing Protocols," IEEE Transactions on Network and Service Management, Apr. 15, 2016.

* cited by examiner

ROUTING STABILITY IN HYBRID SOFTWARE-DEFINED NETWORKING NETWORKS

BACKGROUND

Software-defined networking ("SDN") has gained momentum among providers of network services, including data centers, cloud computing, and wide-area networks ("WANs") service providers. SDN enables network service providers to utilize network resources more efficiently by decoupling the control plane from the data plane and introducing a logically centralized controller. SDN networks facilitate more efficient routing of traffic flows using a centralized network view. On the other hand, traditional distributed routing still enjoys the advantage of better scalability, robustness, and swift reaction to events such as failures. There are therefore significant potential benefits to adopting a hybrid operation where both distributed and centralized routing mechanisms co-exist. Furthermore, two mechanisms operating simultaneously increases robustness since even if one of mechanism fails, the other mechanism will continue to operate. The advantages of adopting a centralized controller are accompanied by implementation challenges with regard to compatibility since not all devices support full SDN functionality and scalability since the centralized controller can be overloaded when the network scales beyond its computational capacity.

Network service providers, such as Internet service providers ("ISPs") that currently operate well-functioning networks, have additional concerns regarding migration to an SDN network. One such concern is the cost of converting legacy networks to SDN networks, which requires extensive hardware investments to install SDN-compatible devices and systems. Network service providers also are wary of migrating from legacy networks to SDN networks because of concerns about network robustness of new SDN networks when the legacy networks operate with networking technologies proven to be robust. Moreover, unlike distributed control, centralized control suffers from decision delay because decisions are made remotely. To respond quickly to condition changes, the centralized controller should be positioned close to its control targets (e.g., local routers), which limits its applicability to WANs. These factors justify why many ISPs have decided to implement hybrid SDN networks in which legacy distributed routing mechanisms remain functional alongside centralized control provided by a centralized controller.

The dual control paradigm in a hybrid SDN network creates new challenges for network management, including routing stability and reconciliation of imperfect information. Stability is a fundamental concern in network routing. A stable routing mechanism maintains the same route for the same traffic flow as long as possible. In the presence of multiple routing control units, a stable route is the route that remains unchanged by any other routing units. Imperfect information poses another challenge. Perfect information about a network's topology and the network's available bandwidth is critical to routing performance. Delayed routing convergence can occur when information about the network topology is obsolete. In a hybrid SDN network, the centralized controller must carefully monitor the network because conflicting views between the centralized controller and distributed local routers can result in disagreements about routing decisions, which can directly cause route flapping and instability.

SUMMARY

Concepts and technologies disclosed herein are directed to routing stability in hybrid SDN networks. As used herein, "routing stability" is consistency between the centralized controller and the local routers operating in a hybrid SDN network. Based on this definition, an algorithmic framework was designed to generate stable routing patterns in a hybrid SDN framework. As used herein, a "stable routing pattern" includes cases where the routing decision made by one entity (e.g., centralized SDN controller) is not changed by another entity (e.g., a local router) unless a network condition changes. The algorithmic framework can execute different algorithm kernels, including a global optimization kernel, a greedy kernel, and a local search kernel, each of which provide a trade-off among time-complexity, cost-effectiveness, and purpose-flexibility. The concepts and technologies disclosed herein also address challenges when routes are determined under imperfect information about a network. In particular, redundancy is used to restore missing network information that can be used as perfect information for routing.

According to one aspect of the concepts and technologies disclosed herein, a centralized SDN controller is designed to achieve stable routing patterns. The centralized SDN controller can collect data plane messages from a plurality of local routers operating within a hybrid SDN network in which control plane functionality is shared between the centralized SDN controller and the plurality of local routers. The centralized SDN controller can extract, from the data plane messages, information corresponding to source nodes and edges of a graph representative of the hybrid SDN network. The centralized SDN controller can store the information corresponding to the source nodes and the edges of the graph as entries in a table. The centralized SDN controller can identify and remove any outdated entries from the table. The centralized SDN controller can obtain recovered information missing from the information collected from the data plane messages. The centralized SDN controller can calculate an effective capacity of the edges. The centralized SDN controller can generate, based upon the recovered information and the effective capacity, a stable routing pattern. The centralized SDN controller can deploy the stable routing pattern in the hybrid software-defined networking network.

In some embodiments, the centralized SDN controller can receive, from a local router of the plurality of local routers, a new data plane message. The centralized SDN controller can check the table for an entry corresponding to the new data plane message. If an entry corresponding to the new data plane message exists, the centralized SDN controller updates the entry and resets a time stamp for the entry to a current time. If, however, an entry corresponding to the new data plane message does not exist, the centralized SDN controller creates a new entry for the new data plane message and sets a time stamp for the entry to a current time.

In some embodiments, the data plane messages include a path computation element communication protocol ("PCEP") message and a border gateway protocol link-state ("BGP-LS") message. The information corresponding to the source nodes is provided in the PCEP message. The information corresponding to the edges is provided in the BGP-LS message.

In some embodiments, the centralized SDN controller can deploy the stable routing pattern in the hybrid SDN network by sending commands to at least a portion of the plurality of local routers, wherein the commands instruct at least the portion of the plurality of local routers to adjust a route for traffic routed within the hybrid SDN network.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1A:
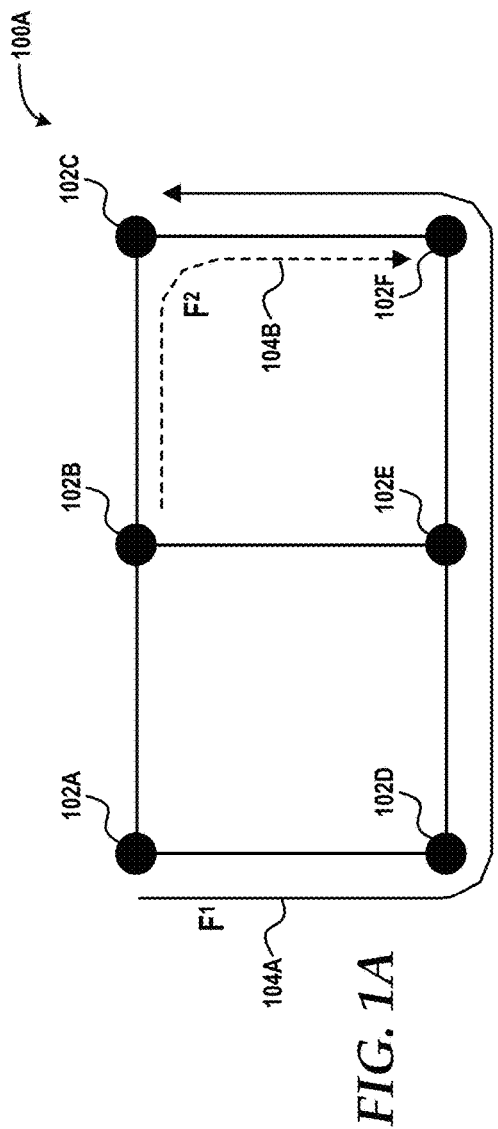
FIGS. 1A and 1B are example routing pattern graphs illustrating aspects of a distributed network topology in which two local routers perform shortest-path routing independently of each other that can end up in stalemate.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

SDN networks adopt a centralized network view to route data traffic more efficiently. Migrating a distributed legacy network to a centralized SDN network can be costly and risky for network service providers. For this reason, network service providers will typically upgrade a network to support SDN functionality instead of fully switching to an exclusively SDN-based network. This results in many network service providers offering networks based upon a hybrid SDN framework. In a hybrid SDN framework, distributed routing remains functional alongside centralized routing, and as such, the consistency between the dual control units plays a critical role in whether the hybrid SDN framework is stable. An inconsistent design can lead to repeated route switching when two control units take turns to adjust the routes. The concepts and technologies disclosed herein establish a model and an algorithmic framework with three different algorithm kernels: global optimization, greedy, and local search. Moreover, the concepts and technologies disclosed herein provide a centralized SDN controller that executes the algorithm kernels to stabilize a hybrid SDN network.

Routing is an essential networking function. Proper routing ensures that data traffic is delivered to its intended destination. One property of a desirable routing mechanism is stability. A stable routing mechanism does not change routing decisions if all inputs remain the same. If routing decisions are changed, data packets might be lost during transfer and/or the routing device responsible for executing the routing decision will consume more power to amend its routing table. Today, distributing routing protocols such as Open Shortest Path First ("OSPF") and Border Gateway Protocol ("BGP") are used in the majority of networks. However, the overall performance of these distributing routing protocols is limited due to the distributed nature. Without coordination, a distributed routing framework can provide a stable but inefficient routing pattern. This concept is illustrated in the examples shown in FIGS. 1A and 1B.

Figure 1B:
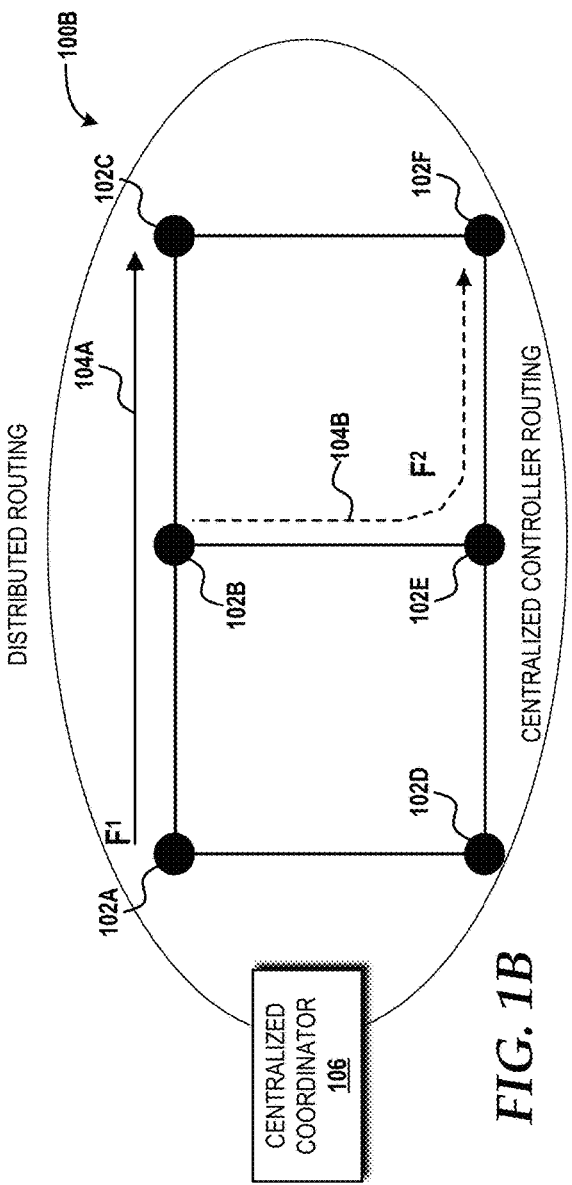

Turning now to FIGS. 1A and 1B, two example routing pattern graphs 100A, 100B are shown. Each of the routing pattern graphs includes a plurality of nodes representative of local routers 102A-102F. Two of the local routers 102A, 102B are source routers that perform shortest-path routing independently of each other. All network edges shown in the pattern graphs 100A, 100B are assumed to have a unit capacity, and the illustrated traffic flows 104A, 104B ($F^1$ and $F^2$) both use a unit sending rate. The first routing pattern graph 100A represents a distributed routing framework that exhibits a stalemate in which neither of the local routers 102A, 102B can find a shorter path to support its traffic flow given the existence of the other flow. The second routing pattern graph 100B introduces a centralized coordinator 106 with a global view of all the local routers 102A-102F available to route data traffic. The centralized coordinator 106 is able to determine a routing pattern in which $F^1$ 104A takes a shorter path from the local router 102A to the local router 102B to the local router 102C instead of traversing the local routers 102A, 102D, 102E, and 102F in the distributed routing example.

The examples shown in FIGS. 1A and 1B demonstrate one motivation for network operators to introduce a centralized coordinator with a global view of local routers to help resolve routing stalemates, and as a result, to improve network efficiency. SDN technologies are well-suited for deploying such a coordinator embodied as a centralized SDN controller. Network operators who have well-functioning networks, such as ISPs, typically do not want to disrupt a network by switching from a distributed routing framework to a centralized routing framework via a single centralized SDN controller. As an alternative, network operators can adopt a hybrid SDN network in which a centralized SDN controller cooperates with local routers to route data traffic. This dual control (hybrid) routing framework introduces new stability challenges, but also significantly improves routing efficiency when compared to a pure distributed routing framework.

Figure 2A:
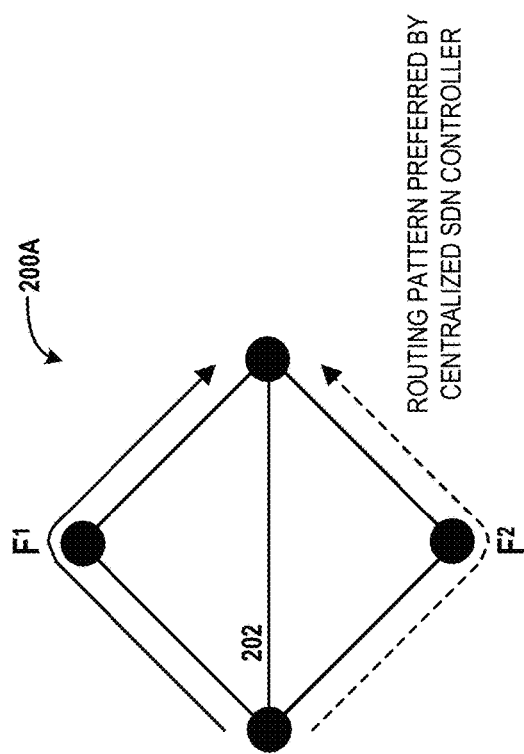
FIGS. 2A and 2B are example routing pattern graphs showing that the inconsistency between a centralized SDN controller and the local routers can cause instability.
Figure 2B:
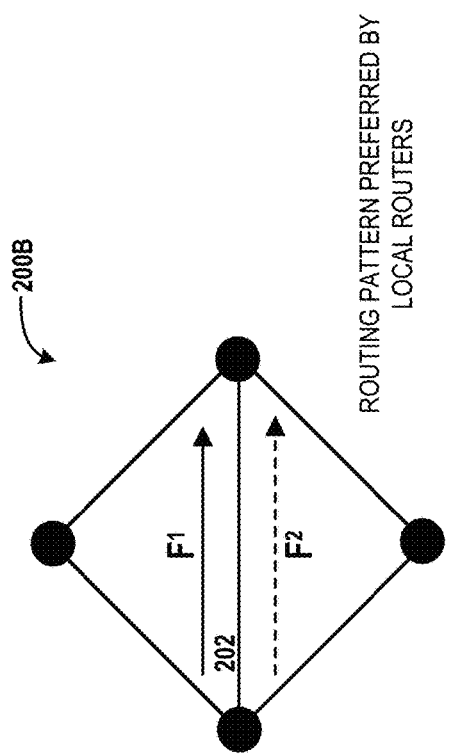

Turning now to FIGS. 2A and 2B, examples are shown to demonstrate that the routing decisions between two routing control units—a centralized SDN controller and a distributed network of local routers—can result in consecutive route switching. In particular, FIG. 2A shows a preferred routing pattern 200A determined by a centralized SDN controller that utilizes load balancing. FIG. 2B shows another preferred routing pattern 200B determined by the local routers based upon the OSPF routing protocol. After the centralized SDN controller determines the preferred routing pattern 200A shown in FIG. 2A, the local routers override this decision with the preferred routing pattern 200B shown in FIG. 2B. Route switching continues as the two routing control units take turns changing the routing pattern. This process results in an unstable network.

In addition to consecutive route switching, a hybrid routing framework can obtain imperfect network information that, when used to make routing decisions, can render a network unstable. For example, in FIG. 2A, if the centralized SDN controller cannot detect one or more links between local routers, such as a middle link 202, the preferred routing pattern 200B will never be a feasible solution for the centralized SDN controller and the resultant routing instability is inevitable. Therefore, a successful hybrid routing framework accounts for missing information (such as information about the middle link 202 in the above example) to maintain routing stability.

Aspects of the concepts and technologies detailed herein provide mechanisms to facilitate stable routing via a hybrid routing framework within hybrid SDN networks. As used herein, the concept of "stability" refers to consistent routing decisions made by both a centralized SDN controller and a distributed network of local routers in a hybrid SDN network (best shown in FIG. 3). An algorithmic framework is designed based upon this definition of stability to execute different algorithm kernels that provide trade-offs between performance and computational complexity for achieving stable routing patterns.

Figure 3:
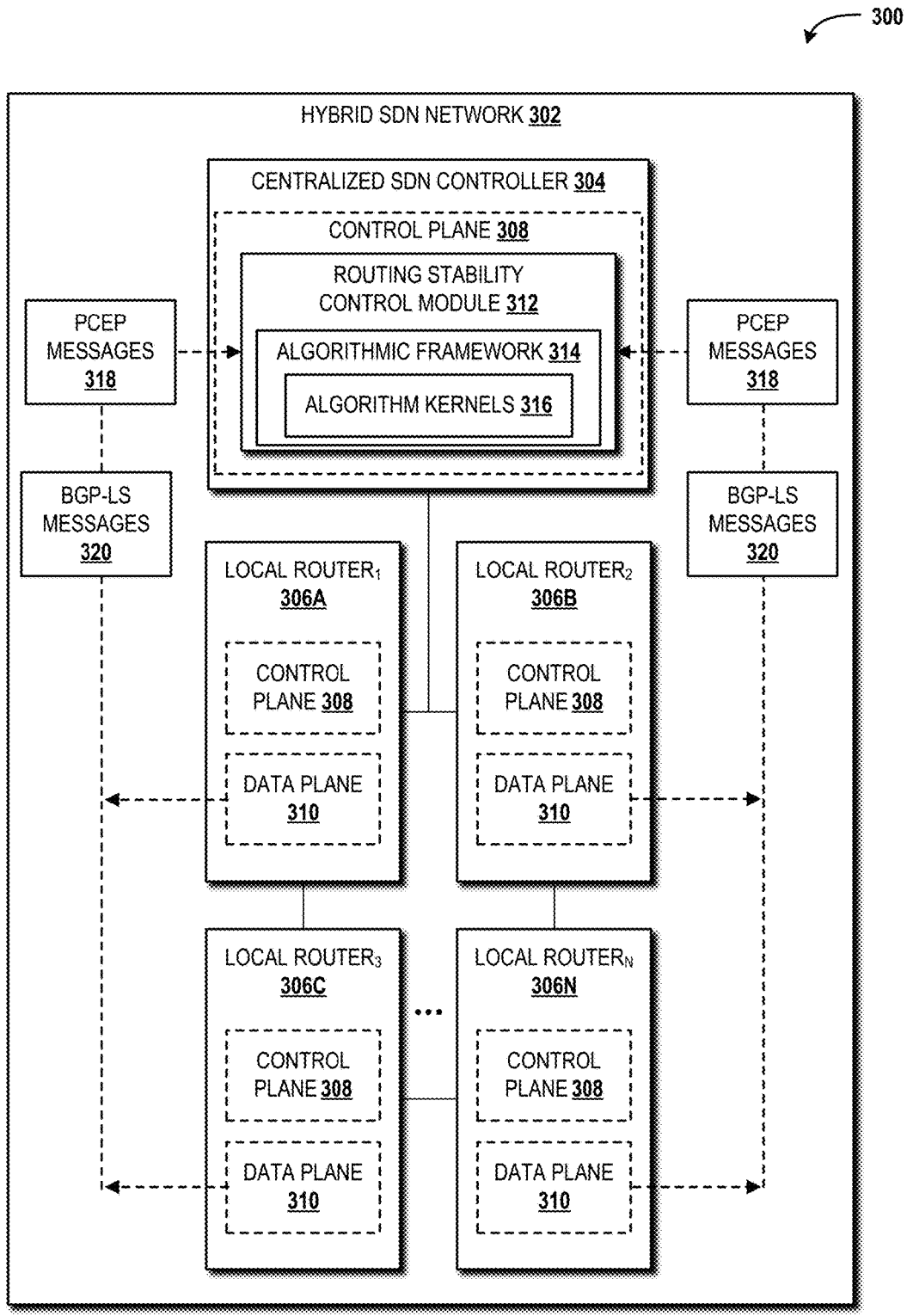
FIG. 3 is a block diagram illustrating aspects of an operating environment capable of implementing aspects of the embodiments presented herein.

Turning now to FIG. 3, aspects of an operating environment 300 capable of implementing aspects of the embodiments presented herein are shown. The operating environment 300 illustrates a hybrid SDN network 302 that includes a centralized SDN controller 304 and a plurality of local routers 306A-306N (collectively, "local routers 306"). The centralized SDN controller 304 and the local routers 306 share control plane 308 functionality. The control plane 308 functionality can include route determination, system/device configuration and management, routing table construction and maintenance, network topology information exchange, and/or other control plane functionality. The local routers 306 also provide data plane 310 functionality to forward data packets along routes at the instruction of the control plane 308. Those skilled in the art will appreciate additional functionality that can be provided by the control plane 308 and the data plane 310.

The control plane 308 functionality in the centralized SDN controller 304 is provided, at least in part, via a routing stability control module 312 that executes an algorithmic framework 314 capable of executing algorithm kernels 316 to obtain stable routing patterns within the hybrid SDN network 302. The algorithm kernels 316 include a global optimization kernel, a greedy kernel, and a local search kernel, each of which are described in detail below.

Before providing details regarding the algorithm kernels 316, some notations will be described. In the examples provided herein, time is denoted by t. A parenthesized t is attached after a variable to refer to its value at time t. An example network, such as the hybrid SDN network 302, can be modeled as a directed graph $G=(V, E)$, where V is the set of nodes containing the local routers 306 and E is the set of nodes containing a set of directed edges representative of the physical links between the local routers 306. Each edge $e \in E$ has a capacity $c_e$ and a cost metric $m_e$, which are both constants. The connectivity of the edge e is indicated by a binary variable $z_e(t)$, which is 1 if the edge is up and 0 if the edge is down.

A set of flows indexed by the set N sends traffic through the hybrid SDN network 302. Each flow $F^n$ is conducted at the rate $r^n(t)$ from its source node $s^n$ to its destination node $d^n$. The source node ($s^n$) and the destination node ($d^n$) are connected by a path specified via the path indicators $x_e^n(t)$, which is 1 when the path includes edge e and is 0 otherwise. The subscript e of $x_e^n(t)$ is omitted to refer to the path as a vector of path indicators. To ensure $x^n(t)$ forms a path, an additional condition $g^n(x^n(t)) \geq 0$ is introduced. A priority class $\pi^n$ is associated with each flow $F^n$, and as described herein, the 3-tuple $<s^n, d^n, \pi^n>$ uniquely defines each flow. If the priority class $\pi^1$ has higher priority than $\pi^2$, then $\pi^1 \leq \pi^2$. The flows with strictly higher priority can acquire bandwidth from lower prioritized flows. The indices of the flows prioritized higher than $\pi$ are given by $N_{\leq \pi} = \{n \in N: \pi^n \leq \pi\}$. Similar definitions apply to $N_{\geq \pi}$ and $N_{=\pi}$. The set of all priority classes is denoted by $\Pi = \{\pi^n: n \in N\}$.

As described herein, each flow $F^n$ is routed via solving the constrained shortest-path first ("CSPF") problem $R^n(t)$ at its source router:

$R^n(t) = \min \Sigma_{e \in E} m_e x_e^n(t)$ such that $$g^n(x^n(t)) \geq 0 \qquad (1a)$$

$$x_e^n(t) \in \{0,1\} \quad \forall e \in E \qquad (1b)$$

$$x_e^n(t) \leq z_e(t) \quad \forall e \in E \qquad (1c)$$

$$\Sigma_{n' \in N_{\leq \pi^n}} r^{n'}(t) x_e^{n'}(t) \leq c_e \quad \forall e \in E \qquad (1d)$$

where the constraints (1a) and (1b) require that $x^n(t)$ be a path; the constraint (1c) ensures that the path can only take the up edges; and the constraint (1d) is the link capacity constraint. The objective function $\Sigma_{e \in E} m_e x_e^n(t)$ gives the metric of the selected path, which is the OSPF cost of the path if $m_e$ is the OSPF cost of the edge e. $R^n(t)$ is polynomial-time solvable: by setting $x_e^n(t) = 0$ for all edges with $z_e(t) = 0$ and removing the constraint (1c), the problem becomes a shortest-path problem, which is polynomial-time solvable. When equal-cost path solutions exist, only one of the solutions is used as the solution based on a tie-break rule provided by a system operator. As used herein, the terms "path" and "route" are used interchangeably because a single path is chosen as the route for data traffic.

The centralized SDN controller 304 collects information from the data plane 310 via two protocols: Path Computation Element Communication Protocol ("PCEP") and Border Gateway Protocol-Link State ("BGP-LS"). This information is represented in the illustrated example as PCEP messages 318 and BGP-LS messages 320. For PCEP, the local routers 306 can report $r^n(t)$ in the PCEP messages 318, and in particular, as a path computation reply message directed to the centralized SDN controller 304. The PCEP messages 318 are marked by $<s^n, d^n, \pi^n>$, so that the corresponding flow can be identified. For BGP-LS, the centralized SDN controller 304 collects link-state information about each edge, which includes $c_e$, $m_e$, $z_e(t)$, and the aggregated traffic rate on the edge per priority $\Sigma_{n \in N_{=\pi}} r^n(t) x_e^n(t)$. The local routers 306 can report the link-state information to the centralized SDN controller 304 via the BPG-LS messages 320.

The local routers 306 report the PCEP messages 318 and the BGP-LS messages 320 to the centralized SDN controller 304 on a periodic basis; however, the reporting time is not necessarily synchronized. The centralized SDN controller 304 can record the time at which each message is received from the local routers 306. This time stamp helps the centralized SDN controller 304 detect outdated information and allows further measures to be taken if outdated information is detected. The hybrid SDN network 302 updates asynchronously.

Figure 4:
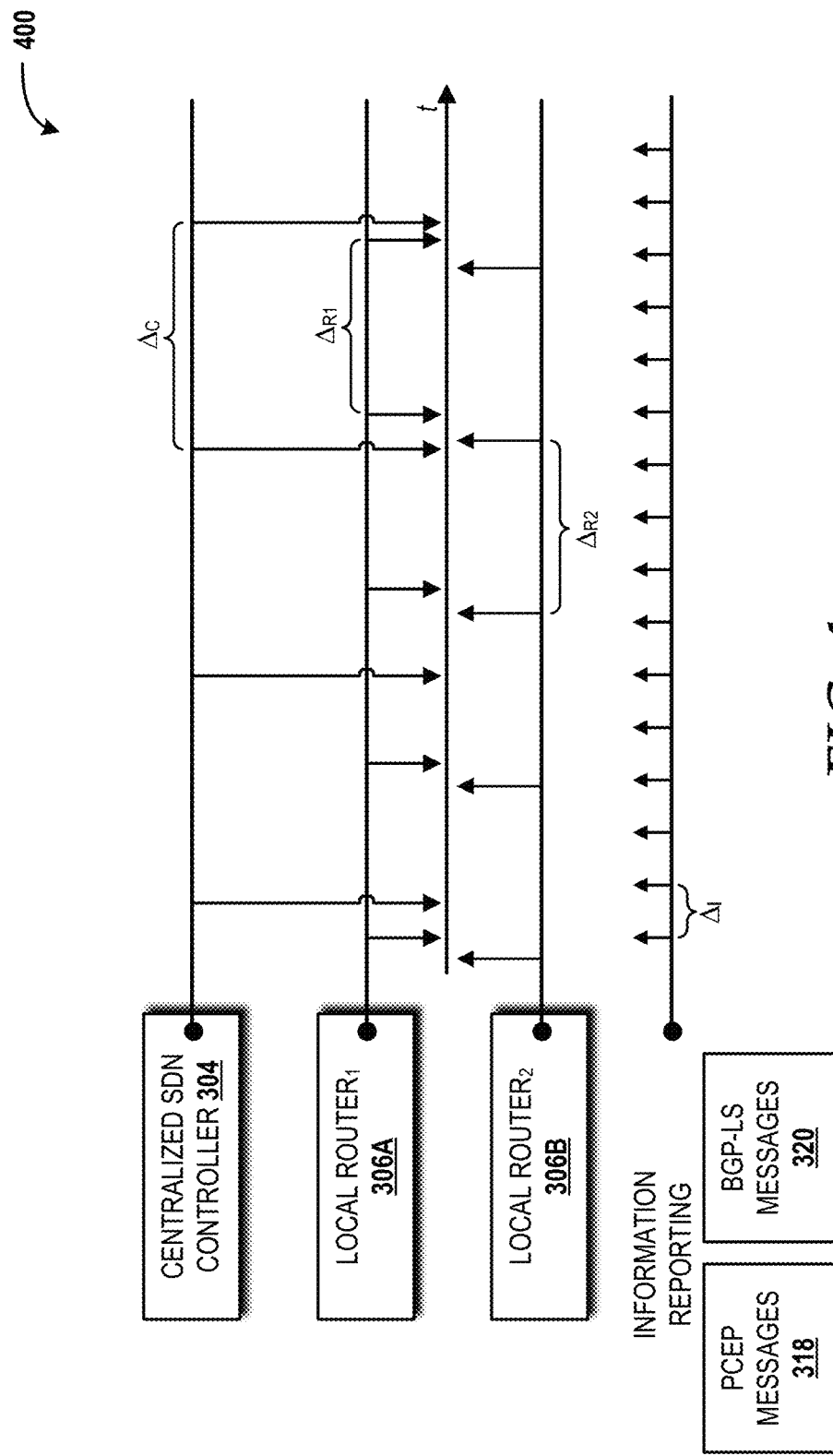
FIG. 4 is a diagram illustrating an example update timeline for a hybrid routing framework, according to an illustrative embodiment.

Turning now to FIG. 4, an example update timeline 400 for the hybrid SDN network 302 will be described. In the illustrated example, centralized SDN controller 304 collects information in the form of the PCEP messages 318 and the BGP-LS messages 320 from the local router$_1$ 306A and the local router$_2$ 306B, and routes traffic every $\Delta_c$ time unit. Similarly, each local router 306 performs CSPF source routing $R^n(t)$ routinely with the interval $\Delta_{R^n}$. The intervals $\Delta_{R^n}$ are not necessarily the same. If a local router 306 computes the route for the flow $F^n$ at time t, that local router 306 will compute the route again at time $t+\Delta_{R^n}$. However, the local routers 306 will perform fast-reroute (by solving $R^n(t)$) whenever it is determined that the assigned routes are no longer feasible. The PCEP messages 318 and the BGP-LS messages 320 are sent at a higher frequency than the frequency with which routes are updated. The same message is sent every $\Delta_I$ time units, while different messages are sent asynchronously. For simplicity, the information reporting interval $\Delta_I$ is a unique value. In real-world implementations, the reporting interval $\Delta_I$ might vary from message to message. However, the effect caused by varying internal size can be ignored because the reporting interval is much shorter than the update interval.

The stability of the hybrid SDN network 302 is characterized by the consistency between centralized routing operations performed by the centralized SDN controller 304 and distributed routing operations performed by the local routers 306. If these two routing control units are not consistent with each other, the routing decision can be overturned repeatedly as the control units take turns modifying the routes. An assumption can be made about the behavior of the local routers 306 to ensure the stability of the distributed routing. In particular, a given local router 306 will not change the selected path for a flow unless the centralized controller orders that local router 306 to change the selected path, the old path is no longer feasible, and/or there exists a new feasible path with strictly lower cost. This assumption results from the fact that the local routers 306 should not switch between equal cost paths, otherwise the distributed routing itself is not stable.

Given the aforementioned assumption, the stability of the hybrid SDN network 302 can be defined such that the hybrid SDN network 302 is stable if the centralized SDN controller 304 makes a decision that is consistent with the decisions made by the local routers 306. In other words, the hybrid SDN network 302 is stable if the centralized SDN controller 304 deploys a routing pattern that is an optimal solution to $R^n(t)$ for all $n \in N$. This definition follows directly from the fact that the local routers 306 route traffic via solving $R^n(t)$ to ensure consistency. Moreover, the centralized SDN controller 304 has the ability to deploy a routing pattern and the local routers 306 will not change the selected paths since the selected paths are already optimal. Therefore, the definition provided above for stability of the hybrid SDN network 302 matches the stability of a routing system in the ordinary sense—namely, the assigned routes will not be switched back and forth.

Using the aforementioned definition for stability of the hybrid SDN network 302, the algorithm kernels 316 for the algorithmic framework 314 can be derived to achieve stable routing patterns. Higher prioritized flows can acquire bandwidth from lower prioritized flows, and therefore higher priority flows are routed first. If a lower prioritized flow is routed first, the bandwidth provided by the lower prioritized flow can still be taken by a higher prioritized flow, which will lead to rerouting. The algorithmic framework 314 takes this into account in pursuit of stable routing patterns. Each of the algorithm kernels 316 is capable of being executed by the algorithmic framework 314 to obtain a stable routing pattern of the flows $F^n$, $n \in N_{=\pi}$ with all higher prioritized flows routed.

The algorithm kernels 316 can include a global optimization algorithm kernel that can be executed by the algorithmic framework 314 to obtain a stable routing pattern by solving a global optimization problem $$C_\pi(t) = \min \Sigma_{n \in N_{=\pi}} \Sigma_{e \in E} m_e x_e^n(t) \text{ such that}$$

$$g^n(x^n(t)) \geq 0 \quad \forall e \in N_{=\pi}$$

$$x_e^n(t) \in \{0,1\} \quad \forall e \in N_{=\pi}, e \in E$$

$$x_e^n(t) \leq z_e(t) \quad \forall e \in N_{=\pi}, e \in E$$

$$\Sigma_{n \in N_{\leq \pi}} r^n(t) x_e^n(t) \leq c_e \quad \forall e \in E$$

The optimal solution to $C_\pi(t)$ is stable, which can be shown by contradiction: If not, there exists $n \in N_{=\pi}$ such that the optimal solution to $C_\pi(t)$ is not an optimal solution to $R^n(t)$. As such, a substation can be made for the optimal solution $x_e^n(t)$ to $R^n(t)$ back to the optimal solution to $C_\pi(t)$, which results in a feasible solution to $C_\pi(t)$ with strictly lower cost than the optimal solution, and it is not possible.

The optimal solution to $C_\pi(t)$ guarantees not only the stability but also the lowest cost in the presence of the route assignment to higher prioritized flows. Obtaining an optimal solution to $C_\pi(t)$ is computationally intractable due to NP-hardness. While NP-hardness can prevent a solution using the global optimization kernel, solving the global optimization problem is unnecessary for obtaining a stable routing pattern for the hybrid SDN network 302. Thus, two alternative methods are described herein below using a greedy algorithm kernel and a local search algorithm kernel.

A greedy algorithm kernel is based on an observation that given a stable routing pattern and a new flow $F^n$, adding the path resulting from $R^n(t)$ on top of the given stable routing pattern yields another stable routing pattern. As such, a stable routing algorithm can be built by adding the route from $R^n(t)$ one at a time, which results in the greedy algorithm kernel. The greedy algorithm kernel has one major drawback, which is shown in FIG. 1. In particular, the performance of the greedy algorithm kernel depends on the solving order of $R''(t)$. Solving $R^2(t)$ before $R^1(t)$ gives FIG. 1A; nevertheless, FIG. 1B can be reached by solving $R^1(t)$ first. Thus, better performance can be achieved by carefully aligning the solving order.

The greedy algorithm kernel can build a stable routing pattern from scratch. In some instances, however, the centralized SDN controller 304 can derive a feasible routing pattern from some heuristics, but still needs to shape the routing pattern into a stable routing pattern. The local search algorithm kernel addresses this problem. In particular, the centralized SDN controller 304 can execute the algorithmic framework 314 with the local search algorithm kernel to maintain the feasibility of routing pattern while improving the routing pattern until no further improvements can be made. In this case, an "improvement" can be defined such that the termination of the local search algorithm kernel implies the stability of the resulted solution. As described above, a routing pattern is stable if there exists no $n \in N_{=\pi}$ such that the routing pattern is not an optimal solution to $R''(t)$. As a result, an improvement is finding $n \in N_{=\pi}$ such that the routing pattern is not an optimal solution to $R''(t)$. This design is summarized by the local search algorithm kernel.

Since solving the global optimization problem is NP-hard, the global optimization algorithm kernel takes exponential-time to solve; the greedy algorithm kernel checks each flow only once, and hence the greedy algorithm kernel is linear-time solvable; and the time complexity of the local search algorithm kernel has been described above. Table 1 below demonstrates that the global optimization and greedy algorithm kernels are two extreme cases. Solving the global optimization is the most computationally expensive with optimal cost-effectiveness, while the greedy algorithm loses this optimality in exchange for lower computational complexity.

Besides these two extremes, the local search algorithm kernel provides flexibility with quadratic-time complexity by allowing the specification of an initial feasible routing pattern. This flexibility is desirable because unless the centralized SDN controller 304 aims to minimize the same objective as the local routers 306, the centralized SDN controller 304 can select a routing pattern based on some other criterion as well as the stability in the same time. The global optimization and the greedy algorithm kernels cannot satisfy additional criterion by nature. This is because both are designed to find only the minimal cost path.

TABLE 1

| | Global Optimization Algorithm Kernel | Greedy Algorithm Kernel | Local Search Algorithm Kernel |
|---|---|---|---|
| Time Complexity | In general, $O(2^{|N|})$ | $O(|N|)$ | $O(|N|^2)$ |
| Cost-Effectiveness | Optimal | Depending on the order | Depending on the order and the initial routing pattern |
| Advantage | Lowest cost | Fastest | Most flexible |

The algorithm kernels described above assume that the centralized SDN controller 304 has access to real-time data plane information from the local routers 306. Perfect information is needed for the algorithm kernels to compute stable routing patterns. However, perfect information might not always be available. Since the centralized SDN controller 304 relies on the data plane 310 to collect information, the information might be lost or delayed during packet delivery. Also, failures of the local routers 306 and/or specific links in the hybrid SDN network 302 can prevent the centralized SDN controller 304 from accurately probing current network states. For these reasons, the algorithmic framework 314 executed by the centralized SDN controller 304 can compute stable routing patterns based upon partial (i.e., imperfect) information. For example, the information may include partial information for flow rate $r''(t)$, flow path $x''(t)$, and/or edge connectivity $z_e(t)$.

The centralized SDN controller 304 can pursue stable routing patterns using partial information via a two-stage methodology that includes an information recovery stage and a stability pursuit stage. During the information recovery stage, the centralized SDN controller 304 can attempt to recover any missing information. During the stability pursuit stage, the centralized SDN controller 304 can use the missing information recovered in the first stage as perfect information for computing stable routing patterns.

The information recovery stage will now be described in detail. The information recovery stage is based upon the concept of N−1 criterion (also known to those skilled in the art as N−1 contingency or N−1 reliability, and particularly applicable in power system operations). The N−1 criterion requires full information recovery of a variable when one protocol message is lost. In the information recovery stage, the N−1 criterion can be met for the flow rate $r''(t)$ and the flow path $x''(t)$, while the information recovery of the edge connectivity $z_e(t)$ is not guaranteed.

As described above, the centralized SDN controller 304 collects information from the data plane 310 via the PCEP messages 318 and the BGP-LS messages 320. For PCEP information, the local routers 306 can report $r''(t)$ in the PCEP messages 318, and in particular, in path computation reply messages directed to the centralized SDN controller 304. The PCEP messages 318 are marked by $<s'', d'', \pi''>$, so that the corresponding flow can be identified. For BGP-LS information, the centralized SDN controller 304 collects link-state information about each edge, which includes $c_e$, $m_e$, $z_e(t)$, and the aggregated traffic rate on the edge per priority $\Sigma_{n \in N_{=\pi}} r''(t) x_e''(t)$ for each priority class $\pi$. The 3-tuple $<s'', d'', \pi''>$ is used to identify the flow. If this 3-tuple is missing, the corresponding flow rate $r''(t)$ and flow path $x''(t)$ are linearly dependent on the aggregated flow information $\Sigma_{n \in N_{=\pi}} r''(t) x_e''(t)$ provided in the BGP-LS messages 320. As such, information for one flow can be fully-restored per priority class via linear algebra, which suggests that the flow rate $r''(t)$ and the flow path $x''(t)$ information both meet the N−1 criterion. On the other hand, the PCEP information $\pi''$ and the BGP-LS information $c_e$, $m_e$, $z_e(t)$ do not have the dependency, and therefore, the N−1 criterion is not met. However, $\pi''$, $c_e$, and $m_e$ are time-independent, and therefore, it is less likely to lose this information. Edge connectivity $z_e(t)$ can be related to flow path $x''(t)$ through the constraint (1c) introduced above. For any $\in E$, $x''(t) \leq z_e(t)$ should be satisfied for all $n \in N$. As such, $z_e(t)=1$ if there exists a flow $F''$ routed through edge e. Therefore, it is still possible to reveal $z_e(t)$ unless no flow is passing through the edge. If no flow is passing through the edge, then $z_e(t)=0$ can be assumed until some flow is routed through the edge by one of the local routers 306.

Figure 5:
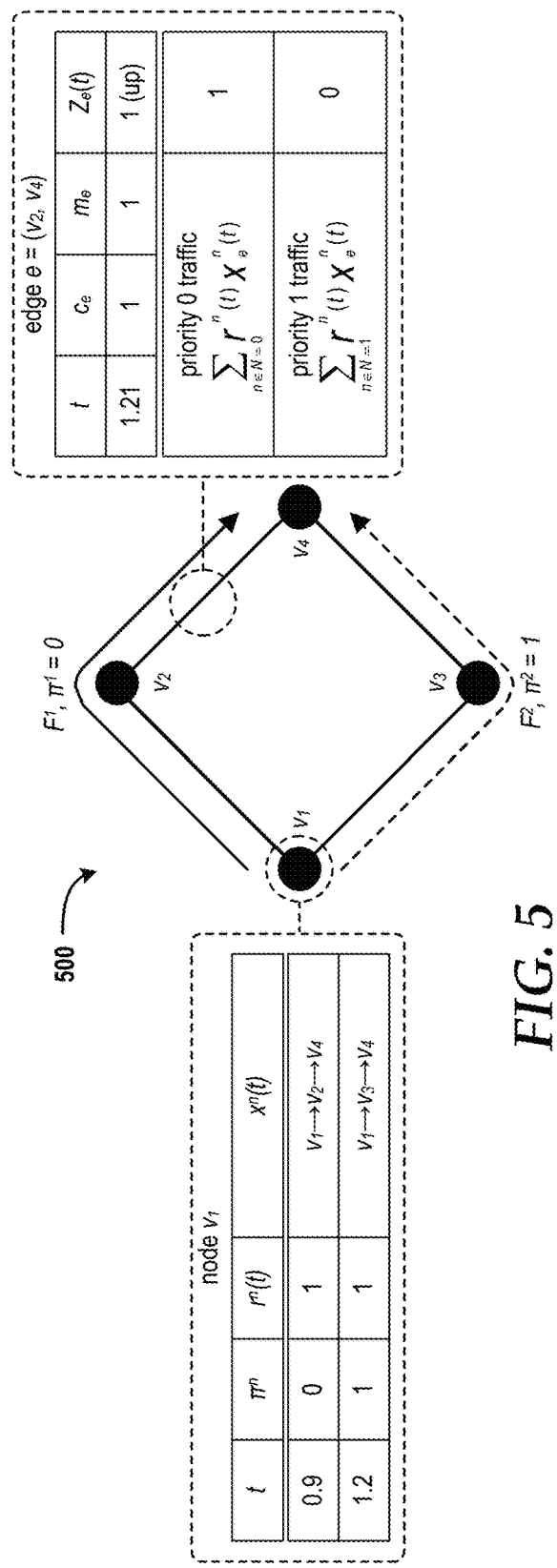
FIG. 5 is a diagram illustrating an example network graph and corresponding tables, according to an illustrative embodiment.

The centralized SDN controller 304 keeps the information received in the PCEP messages 318 and the BGP-LS messages 320 as a graph. The PCEP messages 318 are translated as $\pi''$, $r''(t)$, and $x''(t)$, and stored at the source nodes in the graph. The BGP-LS messages update $c_e$, $m_e$, $z_e(t)$, and $\Sigma_{n \in N_{=\pi}} r^n(t) x_e^n(t)$ that are stored at the edges. When a new message is received, the centralized SDN controller 304 checks if an entry (time stamp t) corresponding the new message was already logged. If so, the centralized SDN controller 304 updates the entry and resets the time stamp t to the current time. Otherwise, the centralized SDN controller 304 creates a new entry to record the message and sets the time stamp as the current time. An example graph 500 is shown in FIG. 5. The illustrated graph 500 includes nodes $v_1$, $v_2$, $v_3$, and $v_4$ that form four unit-capacity edges e, and two flows $F^1$ and $F^2$ both from node $v_1$ to node $v_4$. The PCEP and BGP-LS information reported to the centralized SDN controller 304 can be stored in a corresponding table such as in the illustrated example.

Figure 6:
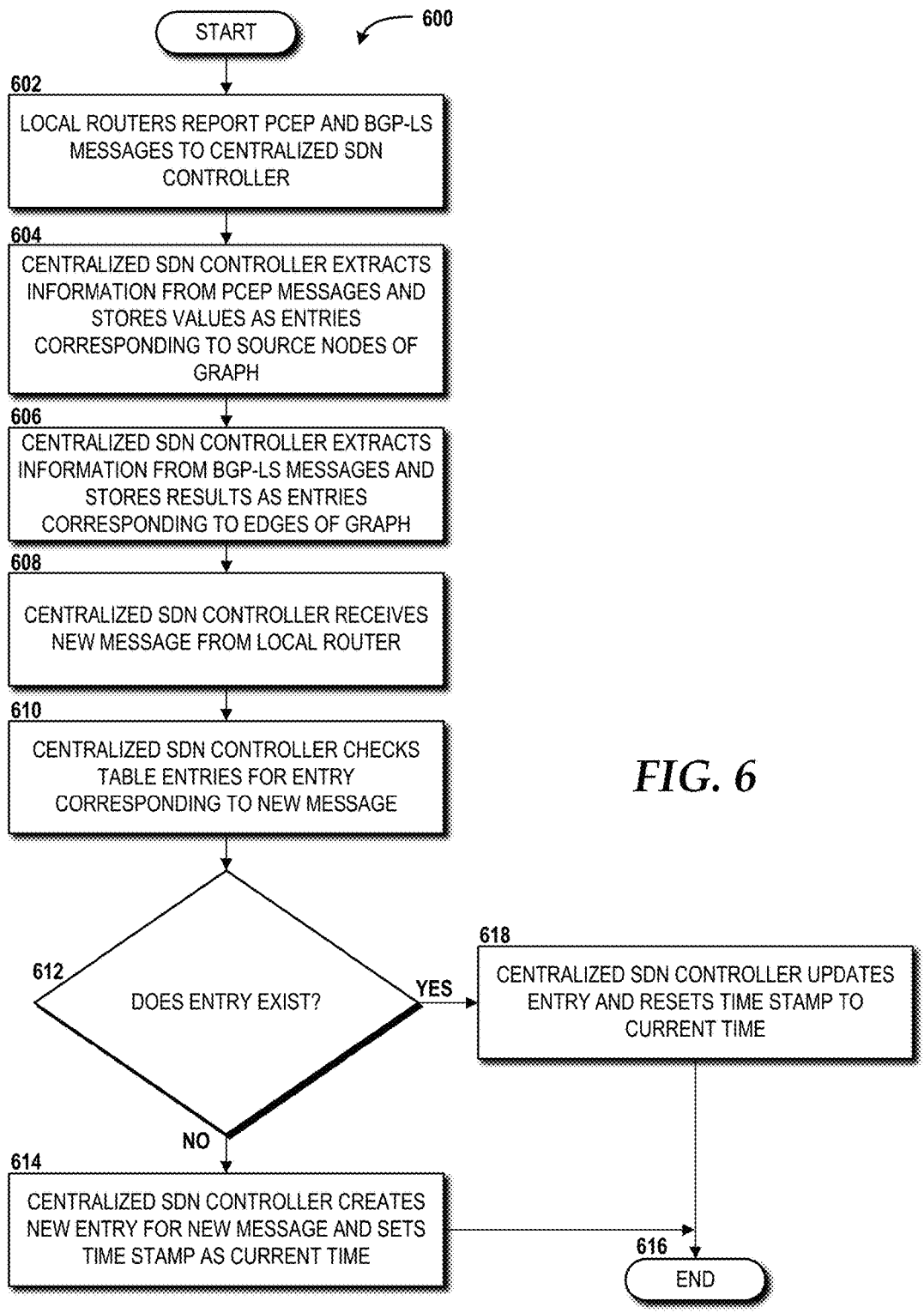
FIG. 6 is a flow diagram illustrating a method for collecting information to be used to generate stable routing patterns, according to an illustrative embodiment.

Turning now to FIG. 6, a method 600 for collecting information to be used to generate stable routing patterns will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of one or more cloud environments, computing systems, devices, engines, controllers, or components disclosed herein to perform operations. It should be understood that the performance of one or more operations may include operations executed by one or more virtual processors at the instructions of one or more of the aforementioned hardware processors.

The method 600 begins and proceeds to operation 602, where the local routers 306 report the PCEP messages 318 and the BGP-LS messages 320 to the centralized SDN controller 304. From operation 602, the method 600 proceeds to operation 604, where the centralized SDN controller 304 extracts, from the PCEP messages 318, $\pi^n$, $r^n(t)$, and $x^n(t)$ and stores the values for these variables as table entries corresponding to one or more source nodes of a graph. From operation 604, the method 600 proceeds to operation 606, where the centralized SDN controller 304 extracts, from the BGP-LS messages 320, $c_e$, $m_e$, $z_e(t)$, and $\Sigma_{n \in N_{=\pi}} r^n(t) x_e^n(t)$ and stores the values for these variables as table entries corresponding to one or more edges of the graph.

From operation 606, the method 600 proceeds to operation 608, where the centralized SDN controller 304 receives a new message from one of the local routers 306. From operation 608, the method 600 proceeds to operation 610, where the centralized SDN controller 304 checks the table entries for an entry corresponding to information contained in the new message. From operation 610, the method 600 proceeds to operation 612, where the centralized SDN controller 304 determines if an entry exists. If the centralized SDN controller 304 determines an entry corresponding to information contained in the new message does not exist, the method 600 proceeds to operation 614, where the centralized SDN controller 304 creates a new entry for the information contained in the new message and sets a time stamp for the new entry to the current time. From operation 614, the method 600 proceeds to operation 616, where the method 600 ends. Returning to operation 612, if the centralized SDN controller 304 determines an entry corresponding to information contained in the new message does exist, the method 600 proceeds to operation 618, where the centralized SDN controller 304 updates the existing entry to include the information contained in the new message and resets the time stamp for the existing entry to the current time. From operation 618, the method 600 proceeds to operation 616, where the method 600 ends.

Figure 7:
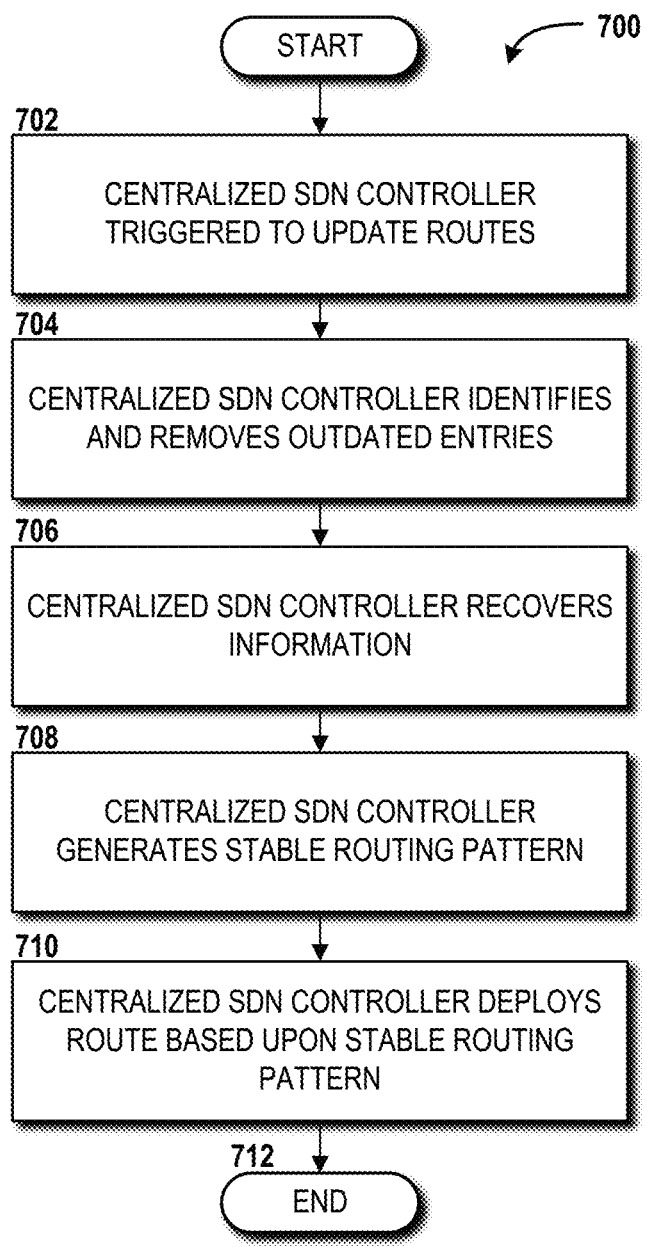
FIG. 7 is a flow diagram illustrating a method for updating routes for a centralized SDN controller, according to an illustrative embodiment.

Turning now to FIG. 7, a method 700 for updating routes in the hybrid SDN network 302 will be described, according to an illustrative embodiment. The method 700 begins and proceeds to operation 702, where the centralized SDN controller 304 is triggered to update one or more routes in the hybrid SDN network 302. The trigger can be the natural turn-by-turn route updates between the local routers 306 and the centralized SDN controller 304. The trigger alternatively can be in response to a request made by a system operator.

From operation 702, the method 700 proceeds to operation 704, where the centralized SDN controller 304 identifies any outdated entries by comparing the time stamp for each entry (i.e., the last receipt time) with the current time. The centralized SDN controller 304 collects only the information which is either time-independent or within an appropriate timeout $\Delta_T$, and all entries falling outside these parameters are removed. $\Delta_T$ must be larger than $\Delta_I$ so as not to discard the latest information.

From operation 704, the method 700 proceeds to operation 706, where the centralized SDN controller 304 recovers any missing information. To recover missing information, the centralized SDN controller 304 can examine each variable and check if a value for each variable can still be obtained when a PCEP message 318 or a BGP-LS message 320 is missing. The centralized SDN controller 304 can first consider a missing flow due to a missing PCEP message 318. A missing flow can be identified from BGP-LS information by comparing the aggregated individual traffic information with the aggregated information reported by BGP-LS. The aggregated individual traffic information and the aggregated information reported by BGP-LS should be the same. If not, the difference must be the missing flow.

The centralized SDN controller 304 can consider whether the flow priority class, link capacity, and link metric can be recovered. Since each of these variables are reported by either PCEP or BGP-LS and are time-independent, it is rarely the case that the information will be missing. The centralized SDN controller 304 only needs to receive values for these once within the multiple reports to confirm the values.

The centralized SDN controller 304 also can consider link connectivity. Link connectivity is time-dependent and is only reported by BGP-LS. A link must be up if there exists a flow going through the link. However, if a link is up when the information is missing and no flow is routed through it, the centralized SDN controller 304 can consider that link disconnected until its connectivity is reported by BPG-LS or some flow is routed through the link. In this manner, the possibility of using a downlink (and any resultant packet loss) is avoided.

Another issue is inconsistent information. This is the case when the information the centralized SDN controller 304 obtains from PCEP and from BGP-LS imply different values of a variable. To deal with this issue, the centralized SDN controller 304 can calculate the "effective capacity," which is the minimum possible available capacity, and solve for stable routing patterns based on that conservative capacity estimation. The idea behind effective capacity is to avoid occupying the bandwidth that is being used but not well detected. Among the reported information of a variable, the centralized SDN controller 304 can take the minimum as its value. Meanwhile, the centralized SDN controller 304 estimates the maximum possible amount of "hidden flows" (i.e., the difference between the maximum reported value and the minimum reported value, which is taken as the nominal value) and deducts the hidden flows from the capacity. In this manner, a feasible solution based on the effective capacities remains feasible even under the presence of hidden flows, which prevents packet dropping caused by unawareness of the hidden flows and occupation of any associated bandwidth.

As described above, the PCEP messages 318 are marked by $<s^\pi, d^\pi, \pi^\pi>$, so that the corresponding flow can be identified. For BGP-LS information, the centralized SDN controller 304 collects link-state information about each edge, which includes $c_e$, $m_e$, $z_e(t)$, and the aggregated traffic rate on the edge per priority $\Sigma_{n \in N_{=\pi}} r^n(t) x_e^n(t)$ for each priority class $\pi$. The 3-tuple $<s^\pi, d^\pi, \pi^\pi>$ is used to identify the flow. If this 3-tuple is missing, the corresponding flow rate $r^n(t)$ and flow path $x^n(t)$ are linearly dependent on the aggregated flow information $\Sigma_{n \in N_{=\pi}} r^n(t) x_e^n(t)$ provided in the BGP-LS messages 320. As such, information for one flow can be fully-restored per priority class via linear algebra, which suggests that the flow rate $r^n(t)$ and the flow path $x^n(t)$ information both meet the N−1 criterion. On the other hand, the PCEP information $\pi^n$ and the BGP-LS information $c_e$, $m_e$, $z_e(t)$ do not have the dependency, and therefore, the N−1 criterion is not met. However, $\pi^n$, $c_e$, and $m_e$ are time-independent, and therefore, it is less likely to lose information. Edge connectivity $z_e(t)$ can be related to flow path $x^n(t)$ through the constraint (1c) introduced above. For any $\in E$, $x^n(t) \leq z_e(t)$ should be satisfied for all $n \in N$. As such, $z_e(t)=1$ if there exists a flow $F^n$ routed through edge e. Therefore, it is still possible to reveal $z_e(t)$ unless no flow is passing through the edge. If no flow is passing through the edge, then $z_e(t)=0$ can be assumed until some flow is routed through the edge by one of the local routers 306. The latest information might be inconsistent since it is reported at a different time. In this case, the effective capacity, which is the minimum possible available capacity, can be calculated, and stable routing patterns can be determined based upon the decreased capacity. For instance, $F^1$ in FIG. 5 adjusts its sending rate from one unit traffic to 0.4 unit traffic. When the centralized SDN controller 304 intervenes, the PCEP information has been received, and $r^1(t)$ is updated to 0.4, but the BGP-LS on edge e still implies that one unit priority 0 flow is active. Accordingly, 0.6 priority 0 flow on edge e as 1−0.6=0.4. On the other hand, if the capacity of e is 2 instead, the effective capacity will be 2−0.6=1.4.

From operation 706, the method 700 proceeds to operation 708, where, based upon the information recovered at operation 706 and the effective capacity of the edges, the centralized SDN controller 304 can execute the algorithmic framework 314 to solve for stable routing patterns. From operation 708, the method 700 proceeds to operation 710, where the centralized SDN controller 304 deploys the stable routing patterns in the hybrid SDN network 302. From operation 710, the method 700 proceeds to operation 712, where the method 700 ends.

Figure 8:
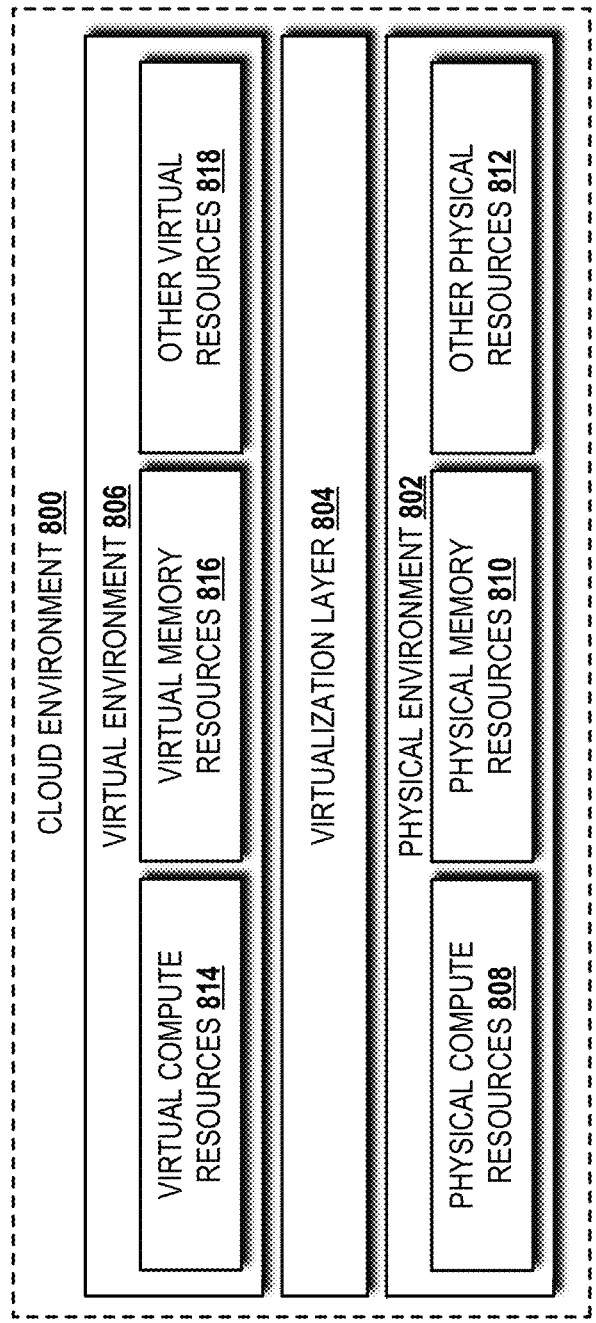
FIG. 8 is a block diagram illustrating aspects of an illustrative cloud environment capable of implementing aspects of the embodiments presented herein.

Turning now to FIG. 8, an illustrative cloud environment 800 will be described, according to an illustrative embodiment. The cloud environment 800 includes a physical environment 802, a virtualization layer 804, and a virtual environment 806. While no connections are shown in FIG. 8, it should be understood that some, none, or all of the components illustrated in FIG. 8 can be configured to interact with one other to carry out various functions described herein. In some embodiments, the components are arranged so as to communicate via one or more networks. Thus, it should be understood that FIG. 8 and the remaining description are intended to provide a general understanding of a suitable environment in which various aspects of the embodiments described herein can be implemented, and should not be construed as being limiting in any way.

The physical environment 802 provides hardware resources, which, in the illustrated embodiment, include one or more physical compute resources 808, one or more physical memory resources 810, and one or more other physical resources 812. The physical compute resource(s) 808 can include one or more hardware components that perform computations to process data and/or to execute computer-executable instructions of one or more application programs, one or more operating systems, and/or other software. In some embodiments, the centralized SDN controller 304 and/or one or more of the local routers 306 can be implemented, at least in part, by the physical compute resources 808. The physical compute resources 808 can include one or more central processing units ("CPUs") configured with one or more processing cores. The physical compute resources 808 can include one or more graphics processing unit ("GPU") configured to accelerate operations performed by one or more CPUs, and/or to perform computations to process data, and/or to execute computer-executable instructions of one or more application programs, one or more operating systems, and/or other software that may or may not include instructions particular to graphics computations. In some embodiments, the physical compute resources 808 can include one or more discrete GPUs. In some other embodiments, the physical compute resources 808 can include CPU and GPU components that are configured in accordance with a co-processing CPU/GPU computing model, wherein the sequential part of an application executes on the CPU and the computationally-intensive part is accelerated by the GPU processing capabilities. The physical compute resources 808 can include one or more system-on-chip ("SoC") components along with one or more other components, including, for example, one or more of the physical memory resources 810, and/or one or more of the other physical resources 812. In some embodiments, the physical compute resources 808 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The physical compute resources 808 can be or can include one or more hardware components architected in accordance with an ARM architecture, available for license from ARM HOLDINGS of Cambridge, United Kingdom. Alternatively, the physical compute resources 808 can be or can include one or more hardware components architected in accordance with an x86 architecture, such an architecture available from INTEL CORPORATION of Mountain View, Calif., and others. Those skilled in the art will appreciate the implementation of the physical compute resources 808 can utilize various computation architectures, and as such, the physical compute resources 808 should not be construed as being limited to any particular computation architecture or combination of computation architectures, including those explicitly disclosed herein.

The physical memory resource(s) 810 can include one or more hardware components that perform storage/memory operations, including temporary or permanent storage operations. In some embodiments, the physical memory resource(s) 810 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the physical compute resources 808.

The other physical resource(s) 812 can include any other hardware resources that can be utilized by the physical compute resources(s) 808 and/or the physical memory resource(s) 810 to perform operations described herein. The other physical resource(s) 812 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The physical resources operating within the physical environment 802 can be virtualized by one or more virtual machine monitors (not shown; also known as "hypervisors") operating within the virtualization/control layer 804 to create virtual resources that reside in the virtual environment 806. The virtual machine monitors can be or can include software, firmware, and/or hardware that alone or in combination with other software, firmware, and/or hardware, creates and manages virtual resources operating within the virtual environment 806.

The virtual resources operating within the virtual environment 806 can include abstractions of at least a portion of the physical compute resources 808, the physical memory resources 810, and/or the other physical resources 812, or any combination thereof. In some embodiments, the abstractions can include one or more virtual machines upon which one or more applications can be executed. In some embodiments, the centralized SDN controller 304 and/or the local routers 306 can be implemented in the virtual environment 806.

Figure 9:
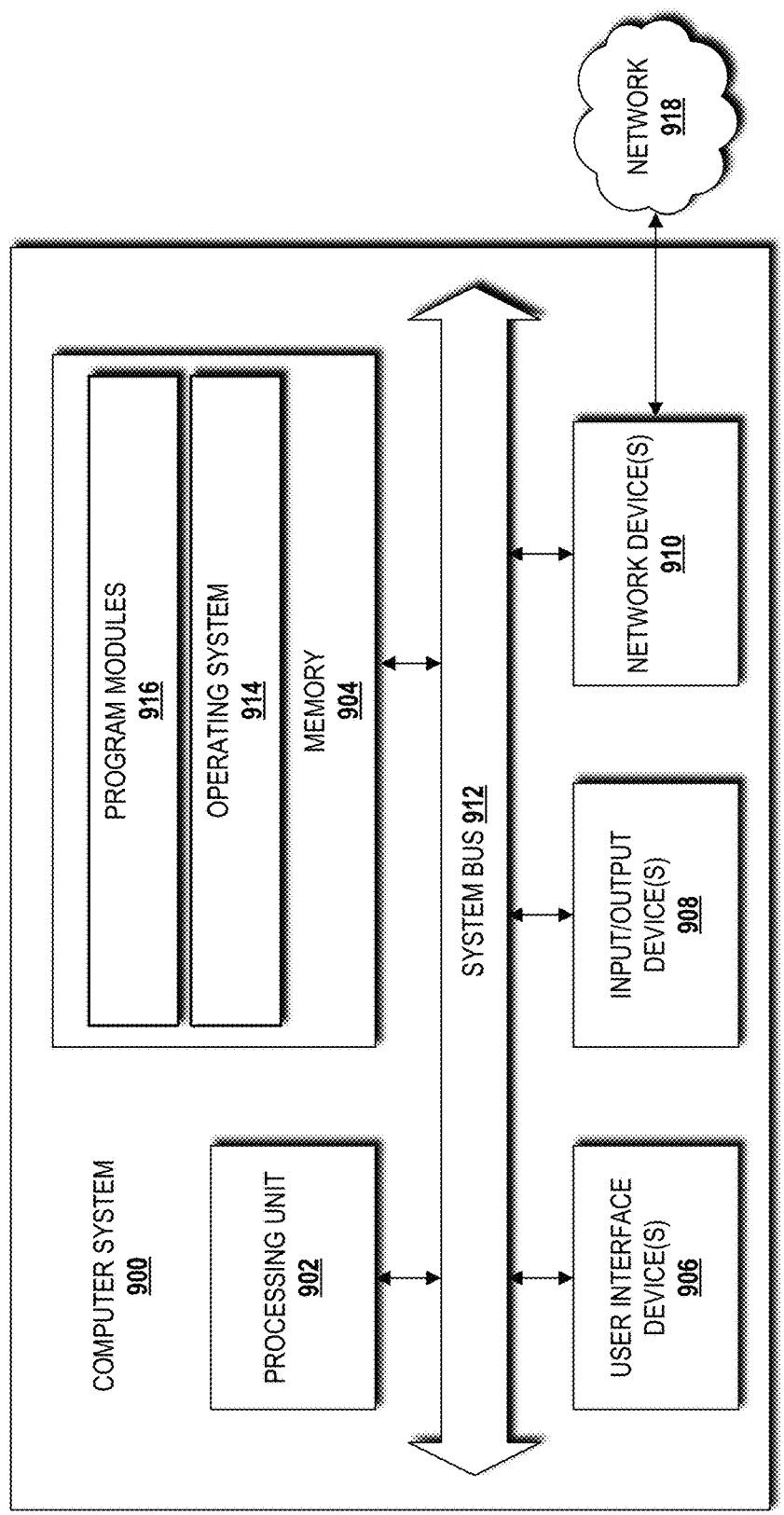
FIG. 9 is a block diagram illustrating an example computer system capable of implementing aspects of the embodiments presented herein.

FIG. 9 is a block diagram illustrating a computer system 900 configured to provide the functionality in accordance with various embodiments of the concepts and technologies disclosed herein. In some embodiments, the centralized SDN controller 304 and/or the local routers 306 can be configured, at least in part, like the architecture of the computer system 900. In some implementations, the physical environment 802 (illustrated in FIG. 8) includes one or more computers that are configured like the architecture of the computer system 900. The computer system 900 may provide at least a portion of the physical compute resources 808, the physical memory resources 810, and/or the other physical resources 812. It should be understood, however, that modification to the architecture may be made to facilitate certain interactions among elements described herein.

The computer system 900 includes a processing unit 902, a memory 904, one or more user interface devices 906, one or more input/output ("I/O") devices 908, and one or more network devices 910, each of which is operatively connected to a system bus 912. The bus 912 enables bi-directional communication between the processing unit 902, the memory 904, the user interface devices 906, the I/O devices 908, and the network devices 910.

The processing unit 902 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein. The physical compute resources 808 (illustrated in FIG. 8) can include one or more processing units 902.

The memory 904 communicates with the processing unit 902 via the system bus 912. In some embodiments, the memory 904 is operatively connected to a memory controller (not shown) that enables communication with the processing unit 902 via the system bus 912. The physical memory resources 810 (illustrated in FIG. 8) can include one or more instances of the memory 904. The illustrated memory 904 contains an operating system 914 and one or more program modules 916. The operating system 914 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 916 may include various software and/or program modules to perform the various operations described herein. The program modules 916 and/or other programs can be embodied in computer-readable media containing instructions that, when executed by the processing unit 902, perform various operations such as those described herein. According to embodiments, the program modules 916 may be embodied in hardware, software, firmware, or any combination thereof.

By way of example, and not limitation, computer-readable media may include any available computer storage media or communication media that can be accessed by the computer system 900. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 900. In the claims, the phrase "computer storage medium" and variations thereof does not include waves or signals per se and/or communication media.

The user interface devices 906 may include one or more devices with which a user accesses the computer system 900. The user interface devices 906 may include, but are not limited to, computers, servers, PDAs, cellular phones, or any suitable computing devices. The I/O devices 908 enable a user to interface with the program modules 916. In one embodiment, the I/O devices 908 are operatively connected to an I/O controller (not shown) that enables communication with the processing unit 902 via the system bus 912. The I/O devices 908 may include one or more input devices, such as, but not limited to, a keyboard, a mouse, or an electronic stylus. Further, the I/O devices 908 may include one or more output devices, such as, but not limited to, a display screen or a printer. In some embodiments, the I/O devices 908 can be used for manual controls for operations to exercise under certain emergency situations.

The network devices 910 enable the computer system 900 to communicate with other networks or remote systems via a network 918. Examples of the network devices 910 include, but are not limited to, a modem, a radio frequency ("RF") or infrared ("IR") transceiver, a telephonic interface, a bridge, a router, or a network card. The network 918 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 918 may be a wired network such as, but not limited to, a Wide Area Network ("WAN"), a wired Personal Area Network ("PAN"), or a wired Metropolitan Area Network ("MAN"). The network 918 may be any other network described herein.

Figure 10:
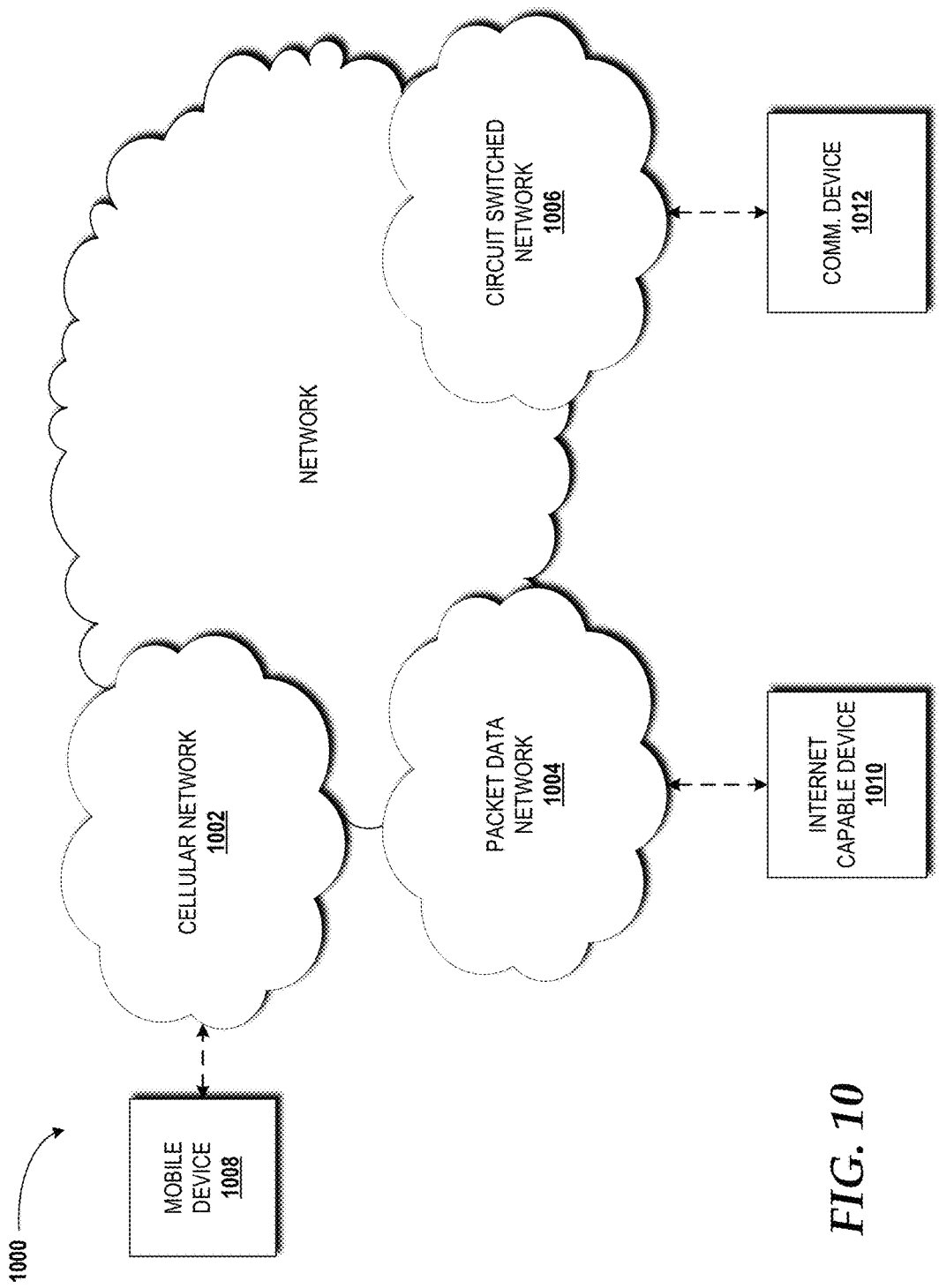
FIG. 10 is a diagram illustrating a network, according to an illustrative embodiment.

Turning now to FIG. 10, details of a network 1000 are illustrated, according to an illustrative embodiment. The network 1000 includes a cellular network 1002, a packet data network 1004, for example, the Internet, and a circuit switched network 1006, for example, a public-switched telephone network ("PSTN"). The cellular network 1002 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HS Ss"), visitor location registers ("VLRs"), charging platforms, billing platforms, voicemail platforms, GPRS core network components, location service nodes, an IP Multimedia Subsystem ("IMS"), and the like. The cellular network 1002 also includes radios and nodes for receiving and transmitting voice, video data, and combinations thereof to and from radio transceivers, networks, the packet data network 1004, and the circuit switched network 1006.

A mobile communications device 1008, such as, for example, a cellular telephone, a user equipment, a mobile terminal, a PDA, a laptop computer, a handheld computer, and combinations thereof, can be operatively connected to the cellular network 1002. The cellular network 1002 can be configured as a Global System for Mobile communications ("GSM") network and can provide data communications via General Packet Radio Service ("GPRS") and/or Enhanced Data rates for GSM Evolution ("EDGE"). Additionally, or alternatively, the cellular network 1002 can be configured as a 3G Universal Mobile Telecommunications Service ("UMTS") network and can provide data communications via the High-Speed Packet Access ("HSPA") protocol family, for example, High-Speed Downlink Packet Access ("HSDPA"), High-Speed Uplink Packet Access ("HSUPA") (also known as Enhanced Uplink ("EUL")), and HSPA+. The cellular network 1002 also is compatible with 4G mobile communications standards such as Long-Term Evolution ("LTE"), or the like, as well as evolved and future mobile standards.

The packet data network 1004 includes various devices, for example, servers, computers, databases, routers, packet gateways, and other devices in communication with one another, as is generally known. The packet data network 1004 can be or can include the hybrid SDN network 302. The packet data network 1004 alternatively can provide connectivity to the hybrid SDN network 302. The packet data network 1004 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 1004 includes or is in communication with the Internet. The circuit switched network 1006 includes various hardware and software for providing circuit switched communications. The circuit switched network 1006 may include, or may be, what is often referred to as a plain old telephone system ("POTS"). The functionality of a circuit switched network 1006 or other circuit-switched network are generally known and will not be described herein in detail.

The illustrated cellular network 1002 is shown in communication with the packet data network 1004 and a circuit switched network 1006, though it should be appreciated that this is not necessarily the case. One or more Internet-capable devices 1010, for example, a PC, a laptop, a portable device, or another suitable device, can communicate with one or more cellular networks 1002, and devices connected thereto, through the packet data network 1004. It also should be appreciated that the Internet-capable device 1010 can communicate with the packet data network 1004 through the circuit switched network 1006, the cellular network 1002, and/or via other networks (not illustrated).

As illustrated, a communications device 1012, for example, a telephone, facsimile machine, modem, computer, or the like, can be in communication with the circuit switched network 1006, and therethrough to the packet data network 1004 and/or the cellular network 1002. It should be appreciated that the communications device 1012 can be an Internet-capable device, and can be substantially similar to the Internet-capable device 1010. In the specification, the network is used to refer broadly to any combination of the networks 1002, 1004, 1006.

Based on the foregoing, it should be appreciated that concepts and technologies directed to routing stability in a hybrid SDN network have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A centralized software-defined networking controller comprising:
   a processor;
   memory having instructions stored thereon that, when executed by the processor, cause the processor to perform operations comprising
      collecting data plane messages from a plurality of local routers operating within a hybrid software-defined networking network in which control plane functionality is shared between the centralized software-defined networking controller and the plurality of local routers,
      extracting, from the data plane messages, information corresponding to source nodes and edges of a graph representative of the hybrid software-defined networking network,
      storing the information corresponding to the source nodes and the edges of the graph as entries in a table,
      identifying, in the table, an outdated entry,
      removing, from the table, the outdated entry,
      obtaining a recovered information,
      calculating an effective capacity of the edges,
      generating, based upon the recovered information and the effective capacity, a stable routing pattern, wherein any routing decision made by the centralized software-defined networking controller is not changed by any of the plurality of local routers and any routing decision made by any of the plurality of local routers is not changed by the centralized software-defined networking controller unless a condition of the hybrid software-defined networking network has changed, and
      deploying the stable routing pattern in the hybrid software-defined networking network.

2. The centralized software-defined networking controller of claim 1, wherein the operations further comprise:
   receiving, from a local router of the plurality of local routers, a new data plane message; and
   checking the table for an entry corresponding to the new data plane message.

3. The centralized software-defined networking controller of claim 2, wherein the operations further comprise, if an entry corresponding to the new data plane message exists:
   updating the entry; and
   resetting a time stamp for the entry to a current time.

4. The centralized software-defined networking controller of claim 2, wherein the operations further comprise, if an entry corresponding to the new data plane message does not exist:
   creating a new entry for the new data plane message; and
   setting a time stamp for the entry to a current time.

5. The centralized software-defined networking controller of claim 1, wherein:
   the data plane messages comprise a path computation element communication protocol message and a border gateway protocol link-state message;
   the information corresponding to the source nodes is provided in the path computation element communication protocol message; and
   the information corresponding to the edges is provided in the border gateway protocol link-state message.

6. The centralized software-defined networking controller of claim 1, wherein deploying the stable routing pattern in the hybrid software-defined networking network comprises sending commands to at least a portion of the plurality of local routers, wherein the commands instruct at least the portion of the plurality of local routers to adjust a route for traffic routed within the hybrid software-defined networking network.

7. A computer-readable storage medium comprising computer-executable instructions that, when executed by a processor of a centralized software-defined networking controller, causes the centralized software-defined networking controller to perform operations comprising:
   collecting data plane messages from a plurality of local routers operating within a hybrid software-defined networking network in which control plane functionality is shared between the centralized software-defined networking controller and the plurality of local routers;
   extracting, from the data plane messages, information corresponding to source nodes and edges of a graph representative of the hybrid software-defined networking network;
   storing the information corresponding to the source nodes and the edges of the graph as entries in a table;
   identifying, in the table, an outdated entry;
   removing, from the table, the outdated entry;
   obtaining a recovered information;
   calculating an effective capacity of the edges;

generating, based upon the recovered information and the effective capacity, a stable routing pattern, wherein any routing decision made by the centralized software-defined networking controller is not changed by any of the plurality of local routers and any routing decision made by any of the plurality of local routers is not changed by the centralized software-defined networking controller unless a condition of the hybrid software-defined networking network has changed; and deploying the stable routing pattern in the hybrid software-defined networking network.

8. The computer-readable storage medium of claim 7, wherein the operations further comprise:

receiving, from a local router of the plurality of local routers, a new data plane message; and checking the table for an entry corresponding to the new data plane message.

9. The computer-readable storage medium of claim 8, wherein the operations further comprise, if an entry corresponding to the new data plane message exists:

updating the entry; and resetting a time stamp for the entry to a current time.

10. The computer-readable storage medium of claim 8, wherein the operations further comprise, if an entry corresponding to the new data plane message does not exist:

creating a new entry for the new data plane message; and setting a time stamp for the entry to a current time.

11. The computer-readable storage medium of claim 7, wherein:

the data plane messages comprise a path computation element communication protocol message and a border gateway protocol link-state message;

the information corresponding to the source nodes is provided in the path computation element communication protocol message; and the information corresponding to the edges is provided in the border gateway protocol link-state message.

12. The computer-readable storage medium of claim 7, wherein deploying the stable routing pattern in the hybrid software-defined networking network comprises sending commands to at least a portion of the plurality of local routers, wherein the commands instruct at least the portion of the plurality of local routers to adjust a route for traffic routed within the hybrid software-defined networking network.

13. A method comprising:

collecting, by a centralized software-defined networking controller, data plane messages from a plurality of local routers operating within a hybrid software-defined networking network in which control plane functionality is shared between the centralized software-defined networking controller and the plurality of local routers;

extracting, by the centralized software-defined networking controller, from the data plane messages, information corresponding to source nodes and edges of a graph representative of the hybrid software-defined networking network;

storing, by the centralized software-defined networking controller, the information corresponding to the source nodes and the edges of the graph as entries in a table;

identifying, by the centralized software-defined networking controller, in the table, an outdated entry;

removing, by the centralized software-defined networking controller, from the table, the outdated entry;

obtaining, by the centralized software-defined networking controller, a recovered information;

calculating, by the centralized software-defined networking controller, an effective capacity of the edges;

generating, by the centralized software-defined networking controller, based upon the recovered information and the effective capacity, a stable routing pattern, wherein any routing decision made by the centralized software-defined networking controller is not changed by any of the plurality of local routers and any routing decision made by any of the plurality of local routers is not changed by the centralized software-defined networking controller unless a condition of the hybrid software-defined networking network has changed; and deploying, by the centralized software-defined networking controller, the stable routing pattern in the hybrid software-defined networking network.

14. The method of claim 13, further comprising:

receiving, by the centralized software-defined networking controller, from a local router of the plurality of local routers, a new data plane message; and checking, by the centralized software-defined networking controller, the table for an entry corresponding to the new data plane message.

15. The method of claim 14, further comprising, if an entry corresponding to the new data plane message exists:

updating, by the centralized software-defined networking controller, the entry; and resetting, by the centralized software-defined networking controller, a time stamp for the entry to a current time.

16. The method of claim 14, further comprising, if an entry corresponding to the new data plane does not exist:

creating, by the centralized software-defined networking controller, a new entry for the new data plane message; and setting, by the centralized software-defined networking controller, a time stamp for the entry to a current time.

17. The method of claim 13, wherein:

the data plane messages comprise a path computation element communication protocol message and a border gateway protocol link-state message;

the information corresponding to the source nodes is provided in the path computation element communication protocol message; and the information corresponding to the edges is provided in the border gateway protocol link-state message.

18. The method of claim 13, wherein collecting the data plane messages from the plurality of local routers comprises receiving the data plane messages from the plurality of local routers on a periodic basis.

19. The method of claim 13, wherein the recovered information comprises a flow rate or a flow path.

20. The method of claim 13, wherein deploying the stable routing pattern in the hybrid software-defined networking network comprises sending commands to at least a portion of the plurality of local routers, wherein the commands instruct at least the portion of the plurality of local routers to adjust a route for traffic routed within the hybrid software-defined networking network.

* * * * *